United States Patent
Maniar

(10) Patent No.: US 9,540,950 B2
(45) Date of Patent: Jan. 10, 2017

(54) OIL DEFLECTOR

(71) Applicant: GM GLOBAL TECHNOLOGY OPERATIONS LLC, Detroit, MI (US)

(72) Inventor: Malay Maniar, Gujarat (IN)

(73) Assignee: GM Global Technology Operations LLC, Detroit, MI (US)

( * ) Notice: Subject to any disclaimer, the term of this patent is extended or adjusted under 35 U.S.C. 154(b) by 904 days.

(21) Appl. No.: 13/669,507

(22) Filed: Nov. 6, 2012

(65) Prior Publication Data
US 2014/0127012 A1    May 8, 2014

(51) Int. Cl.
  F01D 25/18    (2006.01)
  F02C 7/06    (2006.01)
  F02C 6/12    (2006.01)
  F16J 15/16    (2006.01)

(52) U.S. Cl.
  CPC ............. F01D 25/186 (2013.01); F02C 6/12 (2013.01); F02C 7/06 (2013.01); *F05D 2220/40* (2013.01); *F05D 2250/38* (2013.01); *F05D 2260/98* (2013.01); *F16J 15/164* (2013.01)

(58) Field of Classification Search
  CPC ...... F01D 25/183; F01D 25/186; F04D 29/06; F04D 29/063; F04D 29/10; F04D 29/102; F04D 29/104; F16N 2031/025; F05D 2240/70; F05D 2220/40; F05D 2250/38; F05D 2260/98; F02C 6/12; F02C 7/06; F16J 15/16; F16J 15/164
  See application file for complete search history.

(56) References Cited

U.S. PATENT DOCUMENTS

| | | | | |
|---|---|---|---|---|
| 5,636,848 | A | * | 6/1997 | Hager et al. ............ 277/420 |
| 6,008,557 | A | * | 12/1999 | Dornhoefer et al. ...... 310/90 |
| 6,629,816 | B2 | * | 10/2003 | Langston et al. ......... 415/111 |
| 2002/0141862 | A1 | * | 10/2002 | McEwen ............... 415/111 |
| 2007/0172365 | A1 | | 7/2007 | Shimizu et al. |
| 2010/0054934 | A1 | | 3/2010 | Boning et al. |
| 2010/0139270 | A1 | | 6/2010 | Koch et al. |
| 2010/0180589 | A1 | | 7/2010 | Berger et al. |
| 2010/0189558 | A1 | | 7/2010 | Boning et al. |
| 2011/0103948 | A1 | | 5/2011 | Kuzi et al. |
| 2011/0223011 | A1 | | 9/2011 | Boning et al. |

FOREIGN PATENT DOCUMENTS

WO    2012000586 A1    1/2012

* cited by examiner

*Primary Examiner* — Dwayne J White
*Assistant Examiner* — Adam W Brown
(74) *Attorney, Agent, or Firm* — Quinn Law Group, PLLC

(57) ABSTRACT

An oil deflector includes a segment array extending radially from a sleeve portion defining a longitudinal axis and configured for mounting on a shaft. The segment array includes a plurality of segments arranged circumferentially relative to the longitudinal axis and defines at least one oil diverting feature configured to create a pressure differential proximate the segment array or across a surface of the segment array during rotation of the oil deflector about the longitudinal axis. The segment array may define an oil diverting feature configured as a radially tapered peripheral surface, an axially inclined annular surface, at least one slot inclined relative to an annular surface of the array, and/or a combination of these configured to divert oil axially and/or radially from the oil deflector during rotation by the shaft in use.

20 Claims, 6 Drawing Sheets

OIL DEFLECTOR

TECHNICAL FIELD

The present invention relates to an oil deflector configured to divert the flow of oil in a sealed system.

BACKGROUND

A turbocharger typically includes an exhaust gas driven turbine wheel mounted on a rotatable shaft within a turbine housing and a compressor wheel mounted on the opposing end of the rotatable shaft within a compressor housing. The compressor wheel delivers compressed air to the intake manifold of the engine, thereby increasing engine power. The turbocharger shaft is conventionally supported by journal and thrust bearings. A lubricating system is provided within the central bearing housing to provide lubricating oil to the bearings. A sealing system is required to prevent oil leakage from the central bearing housing into the compressor and/or the turbine housing. Low boost pressures which may cause a significant drop in pressure from the bearing housing to the compressor housing and/or high crankcase pressures during engine idling may encourage oil leakage, especially into the compressor housing. The oil sealing systems may typically include a sealing ring located between turbocharger shaft and the sealing plate separating the central housing from the compressor housing, through which the shaft extends. Known methods to reduce oil leakage include keeping the crankcase at vacuum, and/or using more than one sealing ring to seal the interface between the bearing and compressor housings, both methods contributing increased system complexity and cost.

SUMMARY

An oil deflector including a sleeve portion defining a longitudinal axis and a segment array extending radially from the sleeve portion is provided. The segment array includes a plurality of segments distributed circumferentially relative to the longitudinal axis, and defines an oil diverting feature configured to create a pressure differential proximate the segment array during rotation of the oil deflector about the longitudinal axis. The oil deflector may be configured for mounting to a rotatable shaft, such as a turbocharger shaft of a turbocharger, where the turbocharger may be configured for use with an engine, such as a vehicle engine, such that an oil sealing system of the turbocharger comprises the oil deflector. The oil deflector may be positioned on the turbocharger shaft in a bearing housing of the turbocharger and adjacent an oil seal plate such that the oil deflector may be configured to divert oil distributed in the bearing housing from a sealed joint defined by the oil seal plate between the bearing housing and an adjacent housing, such as a compressor housing or a turbine housing of the turbocharger.

The oil deflector may include one or more oil diverting features configured to create a pressure differential during rotation, causing oil proximate the oil deflector and/or the oil diverting feature to flow and/or be diverted axially and/or radially away from a surface of the oil deflector, where the surface may be defined by a face of the oil deflector, for redistribution within the bearing housing or removal from the bearing housing through a drainage port defined by the bearing housing to be, for example, recirculated in a sealed system including the bearing housing. In the example configurations described herein, an oil diverting feature defined by the oil deflector may include one or more of a peripheral face, an offset face, an annular face, a slot, or a combination of these configured to individually and/or in combination divert oil axially and/or radially from the oil deflector during rotation of the oil deflector rotatably mounted on the turbocharger shaft in use.

At least one segment of the plurality of segments of the deflector segment array may define a peripheral face which may be radially tapered relative to the longitudinal axis. The radially taper may be characterized by a radius which increases from a leading end of the segment to a trailing end of the segment, where the leading and trailing ends of the segment may be determined relative to the direction of rotation of the oil deflector in use.

The oil deflector may define an offset face extending between a first segment and a second segment of the plurality of segments, where the first and the second segments are circumferentially adjacent segments. The offset face may be inclined relative to a radial axis intersecting with and perpendicular to the longitudinal axis, and/or may define a parallelogram shaped face.

At least one segment of the plurality of segments may define a first annular face and a second annular face, where one of the first and second annular faces is inboard of the other relative to the bearing housing when the oil deflector is rotatably mounted on the turbocharger shaft in use. At least one of the first and second annular faces may be axially tapered and/or skewed relative to the longitudinal axis and/or inclined to the other of the first and second annular faces to define an oil diverting feature.

A slot may extend between and or separate two circumferentially adjacent segments of the segment array, and be angled relative to an annular face defined by the segment array to define an oil diverting feature. The slot may be configured as a radial slot or as a non-radial slot and may be configured to divert oil axially and/or radially from the oil deflector.

The above features and other features and advantages of the present invention are readily apparent from the following detailed description of the best modes for carrying out the invention when taken in connection with the accompanying drawings.

DETAILED DESCRIPTION

Figure 1:
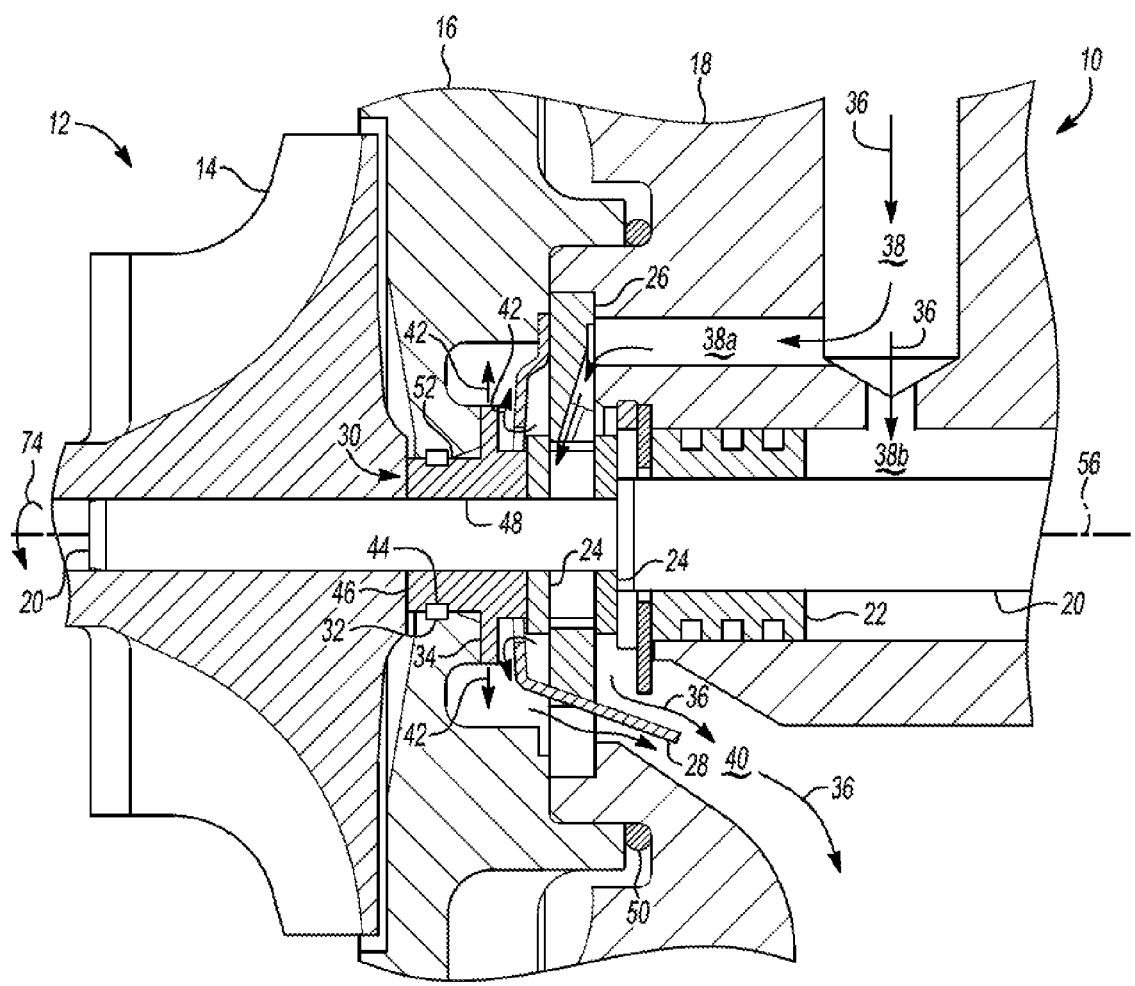
FIG. 1 is a schematic partial cross-sectional view of the compressor end of a turbocharger including an oil deflector.

Referring to the drawings wherein like reference numbers represent like components throughout the several figures, the elements shown in FIGS. 1-6B are not to scale or proportion. Accordingly, the particular dimensions and applications provided in the drawings presented herein are not to be considered limiting. FIG. 1 shows a partial cross-sectional view of a turbocharger generally indicated at 10. The turbocharger may be configured for use with an engine (not shown), such as an internal combustion engine of the type used in a vehicle.

The turbocharger 10 comprises a compressor generally indicated at 12 including a compressor wheel 14 housed in a compressor housing (not shown) and rotatably mounted on a turbocharger shaft 20. The turbocharger shaft 20 extends from the compressor wheel 14 through an aperture defined by an annular shoulder 52 of a back plate 16, through a central bearing housing 18, and into a turbine housing (not shown). The turbocharger 10 further includes a turbine wheel housed in the turbine housing (not shown) and rotatably mounted on an end of the turbocharger shaft 20 opposing the compressor wheel 14. In use, the turbine wheel (not shown) is rotated by the passage of exhaust gas across the turbine wheel from an engine (not shown) in fluid communication with the turbocharger, which in turn rotates the shaft 20 and the compressor wheel 14 rotatably mounted thereon about a longitudinal axis 56. In the example shown, the shaft 20 in use is rotated by the turbine wheel in the direction indicated by arrow 74. Rotation of the compressor wheel 14 delivers boost air to the engine. The compressor end of the turbocharger shaft 20 rotates on a journal bearing 22 housed in the bearing housing 18. The bearing housing 18 houses a thrust bearing 26 and thrust plates 24. The bearing housing 16 defines an oil inlet port 38 including oil passages 38a and 38b, through which oil 36 is fed respectively to the thrust bearing 26 and journal bearing 22, for lubrication thereof. As the shaft 20 rotates, oil 36 in the bearing housing 18 may be directed by an oil shield 28 to drain into an oil outlet 40, from which the oil 36 may be drained back to the engine via the oil outlet 40, and a portion of the oil 36 in the bearing housing 18 may be propelled toward the back plate 16.

The compressor 12 including the compressor wheel 14 is separated from the bearing housing 18 by an oil sealing system including the back plate 16, which may be referred to herein as an oil seal plate. The oil sealing system further comprises a shaft seal 32, a housing seal 50, and an oil deflector 30 configured as described further herein. The oil sealing system including the oil deflector 30 is configured to cooperate with the oil seal plate 16 to prevent oil 36 in the bearing housing 18 from leaking into the compressor 12, particularly at low compressor rotating speeds or in the presence of higher crankcase pressures, which may result in a pressure drop from the bearing housing 18 to the compressor 12. The oil seal plate 16 is fixed in position relative to the bearing housing 18. The housing seal 50, which may be a sealing ring or an annular seal such as an o-ring seal, is configured to seal the interface between the oil seal plate 16 and the bearing housing 18.

The oil deflector 30 includes a flange 34, which will be described in further detail herein and which may be referred to herein as a segment array 34, and a sleeve portion 46. The sleeve portion 46 defines a central passage 48, an exterior surface 54 recess 44, which may be configured as an annular groove 44 (see FIGS. 2A-2B). The exterior surface 54 of the sleeve portion 46 may be generally cylindrical. The oil deflector 30 is mounted for rotation with the shaft 20 such that the central passage 48 interfaces with the shaft 20 and such that the oil deflector 30 rotates with the shaft 20 and relative to the oil seal plate 16. The central passage 48 may be generally cylindrical. The deflector 30 may be made from a metallic material, such as a ferrous based material. The deflector 30 and/or oil diverting features defined by the deflector 30 may be formed using one or a combination of heading, stamping, machining, coining, and milling methods.

The oil seal plate 16 defines an annular shoulder 52 configured to receive the sleeve portion 46 of the deflector 30. In the example shown, the annular shoulder 52 may define a generally cylindrical surface interfacing with the exterior surface 54 and/or recess 44 of the sleeve portion 46. The recess 44 may be configured as a generally annular groove or slot configured to receive the shaft seal 32. The shaft seal 32, which may be configured as an annular seal or sealing ring, such as a piston-type seal, is received by the annular groove 44 and disposed between the annular shoulder 52 of the oil seal plate 16 and the oil deflector 30 such that the shaft seal 32 is retained in sealing contact with the oil deflector 30 and the oil seal plate 16 to prevent leakage of oil 36 from the bearing housing 18 to the compressor 12.

The deflector flange 34, which may also be referred to herein as a segment array, may be configured as illustrated by the examples 34A-34E shown in FIGS. 2A-6B and as described in further detail herein, to include a plurality of flange segments 72 which are distributed circumferentially and which extend radially from the sleeve portion 46. Each of the plurality of flange segments 72 may be referred to individually as a flange segment 72. The segment array 34 rotates with rotation of the shaft 20 such that each of the flange segments 72 diverts oil 36 from the sealed interface, where the sealed interface refers to the interface defined by the shaft seal 32 in operative contact with the deflector 30 and the oil seal plate 16. Oil 36 may be diverted radially and/or axially from the segment array 34 via a diverted oil path generally indicated by the arrows 42 in FIGS. 1-6B, such that the oil 36 is diverted and/or directed away from the compressor 12 and toward the thrust bearing 26 and/or the shield 28 for recirculation in the bearing housing 18 and/or to be drained from the bearing housing 18 via the oil outlet 40.

The segment array 34 may define one or more diverting features as further described herein, wherein the diverting features may individually and/or in cooperation or combination with each other induce one or more pressure differentials proximate to the oil deflector 30 or a surface thereof during rotation of the oil deflector 30 and segment array 34, such that the pressure differentials thus created cause oil 36 proximate to or contacting the deflector 30 to flow directionally along a surface of the deflector 30 and/or to be diverted from the deflector 30 along one or more diverted oil paths 42.

Figure 2A:
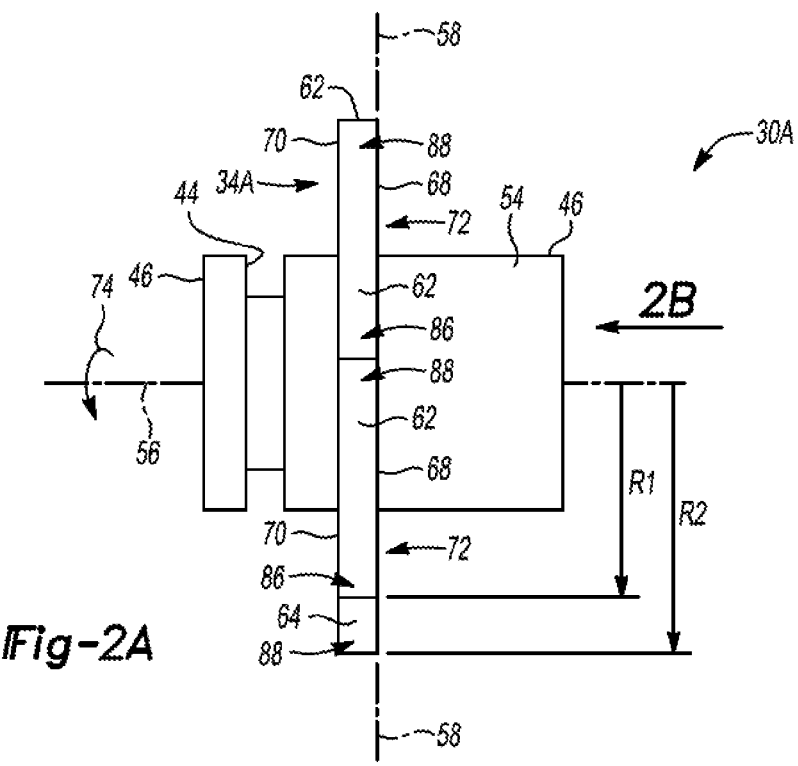
FIG. 2A is a schematic side view of a first example configuration of the oil deflector of FIG. 1.
Figure 2B:
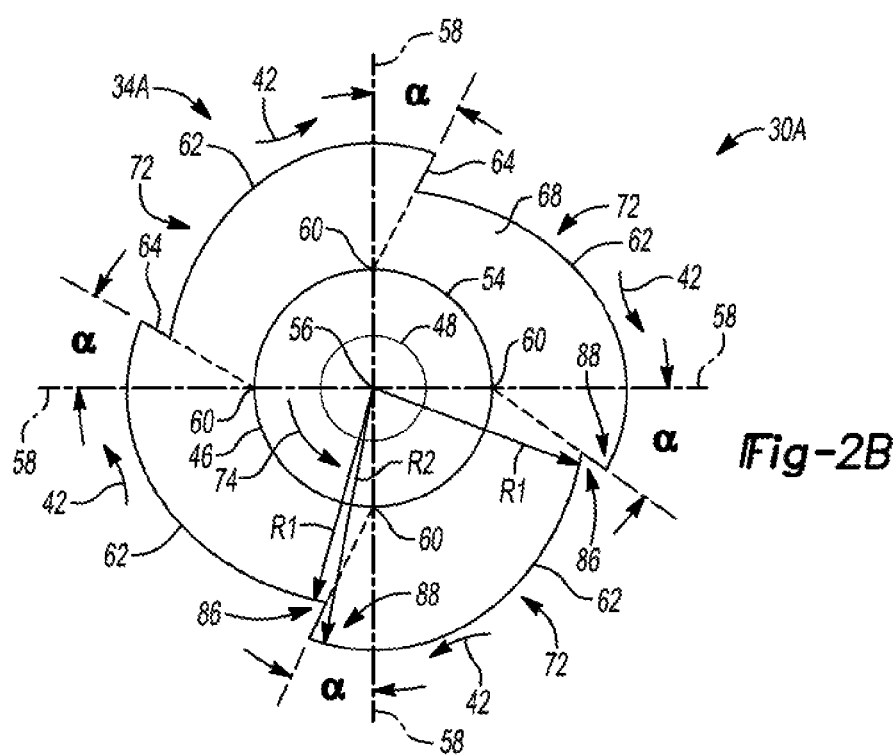
FIG. 2B is a schematic end view of the oil deflector of FIG. 2A.

Referring now to FIGS. 2A-2B, a first example configuration of the oil deflector 30 is generally indicated at 30A. The oil deflector 30A includes a segment array 34A extending radially from the sleeve portion 46 of the oil deflector 30A and defining a plurality of flange segments 72 distributed circumferentially relative to the sleeve portion 46 and to the longitudinal axis 56. Each of the flange segments 72 defines a first annular face 68 and a second annular face 70. In an installed position in the turbocharger 10 the first annular face 68 is positioned or faces inboard relative to the bearing housing 18 and the second annular face 70 is positioned or faces outboard relative to the bearing housing 18. The first annular face 68 may be referred to herein as the inboard face, and the second annular face 70 may be referred to herein as the outboard face of the flange segment 72. In the example deflector 30A, the inboard and outboard faces 68, 70 may be substantially parallel to each other and perpendicular to the longitudinal axis 56, such that each of the faces 68, 70 are parallel to a radial axis 58, where the radial axis 58 intersects and is perpendicular to the longitudinal axis 56.

Each flange segment 72 further defines at least one oil diverting feature which may include a peripheral face 62, an offset face 64, and/or a combination of these. The peripheral face 62 extends radially from a leading end 86 of the segment 72 to a trailing end 88 of the segment 72, where the leading end 86 and the trailing end 88 are relative to the direction of rotation 74 of the deflector 30A in use. The peripheral face 62 may be radially tapered, with a radius increasing from a leading radius R1 to a trailing radius R2, where R2>R1, as shown in FIG. 2B. The offset face 64 is connected to the peripheral face 62 of a first segment 72 and further connected to the peripheral face 62 of a second segment 72 adjacent the first segment 72 to define a transition surface between the trailing end 88 of the first segment 72 and the leading end 86 of the second segment 72 circumferentially adjacent the first segment. In the example shown, the offset face 64 has a radial length of approximately (R2−R1). The offset face 64 of the deflector 30A may not extend exactly radially, but as shown in FIG. 2B may be inclined from the radial axis 58 by a non-radial angle α originating from a point other than the intersection of the longitudinal and radial axes 56, 58. In the non-limiting example shown, the angle α may originate from an origin 60 coinciding with the intersection of the radial axis 58 and the exterior surface 54 of the sleeve portion 46.

In operation, the deflector 30A is rotated in use in the direction 74 by rotation of the shaft 20, where rotation of the deflector 30A creates pressure differentials along the peripheral face 62 and the adjacent offset face 64 such that oil 36 proximate to or contacting the deflector 30 travels along the peripheral face 62 to be flung radially away from the deflector 30A along a diverted oil path 42, as shown in FIG. 2B and away from the sealed interface defined by the shaft seal 32 in contact with the recess 44 and annular shoulder 52, thereby preventing leakage of oil 36 through the oil seal plate 16 to the compressor 12.

Figure 3A:
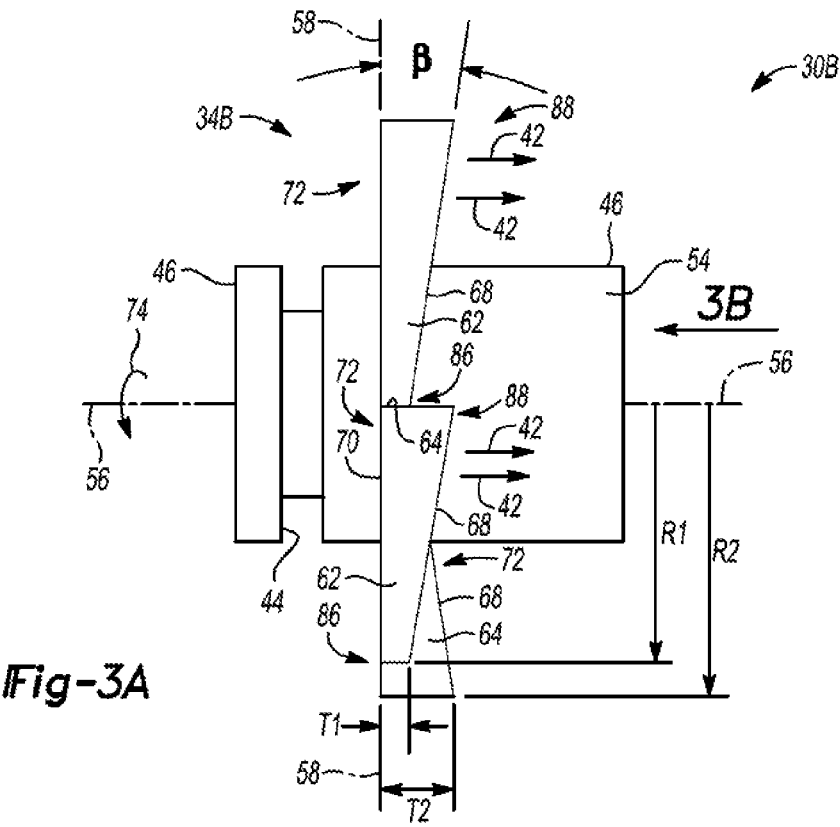
FIG. 3A is a schematic side view of a second example configuration of the oil deflector of FIG. 1.
Figure 3B:
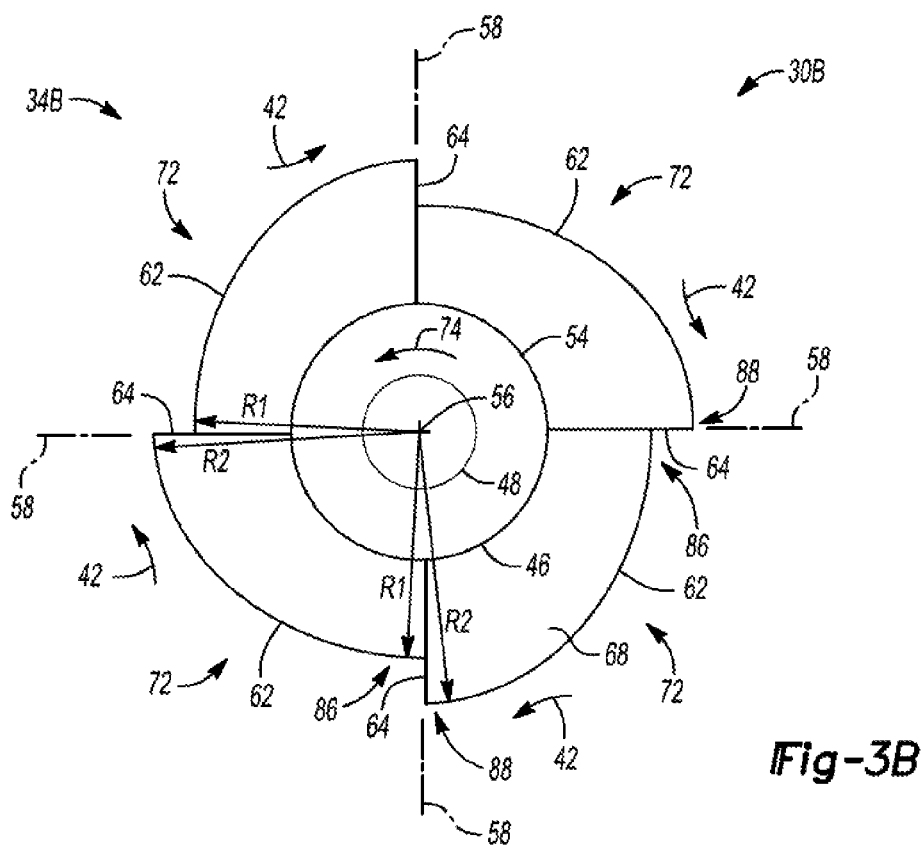
FIG. 3B is a schematic end view of the oil deflector of FIG. 3A.

Referring now to FIGS. 3A-3B, a second example configuration of the oil deflector 30 is generally indicated at 30B. The oil deflector 30B includes a segment array 34B extending radially from the sleeve portion 46 of the oil deflector 30B and defining a plurality of flange segments 72 distributed circumferentially relative to the sleeve portion 46 and to the longitudinal axis 56. Each flange segment 72 defines a first annular face 68 and a second annular face 70 which in an installed position in the turbocharger 10 may be configured as an inboard face 68 and an outboard face 70 as described previously related to FIGS. 2A-2B. In the example shown in FIGS. 3A-3B for deflector 30B, the outboard face 70 may be substantially perpendicular to the longitudinal axis 56 and parallel to a radial axis 58, where the radial axis 58 intersects and is perpendicular to the longitudinal axis 56. The inboard face 68 may be axially tapered such that the segment 72 varies in thickness from a first thickness T1 at the leading end 86 of the segment 72 to a second thickness T2 at the trailing end 88 of the segment 72, and such that the inboard face 68 is inclined relative to the outboard face 70 and/or the radial axis 58 by an angle β shown in FIG. 3A.

Each flange segment 72 further defines a peripheral face 62 and an offset face 64. The peripheral face 62 extends radially from a leading end 86 of the segment 72 to a trailing end 88 of the segment 72, where the leading end 86 and the trailing end 88 are relative to the direction of rotation 74 of the deflector 30B in use. The peripheral face 62 may be radially tapered, with a radius increasing from a leading radius R1 to a trailing radius R2, where R2≥R1, as shown in FIG. 3B. The offset face 64 is formed by the transition surface defined by the offset of the trailing end 88 of a first segment 72 and the leading end 86 of a second segment 72 circumferentially adjacent the first segment, as shown in FIG. 3A. In the non-limiting example shown in FIGS. 3A-3B, the offset face 64 of the deflector 30B extends radially.

In operation, the deflector 30B is rotated in the direction 74 by rotation of the shaft 20, where rotation of the deflector 30B creates pressure differentials along oil diverting features defined by the deflector 30B, which may include the peripheral faces 62, the adjacent offset faces 64, the inclined inboard faces 68 of the segment array 34B and/or a combination of these such that oil 36 proximate to or contacting the deflector 30B is directed and/or travels along one or more of the faces 62, 64 and 68 to be flung radially and axially away from the deflector 30B along a diverted oil path 42, as shown in FIGS. 3A-3B and is diverted away from the sealed interface defined by the shaft seal 32 in contact with the recess 44 and annular shoulder 52, thereby preventing leakage of oil 36 through the oil seal plate 16 to the compressor 12.

Figure 4A:
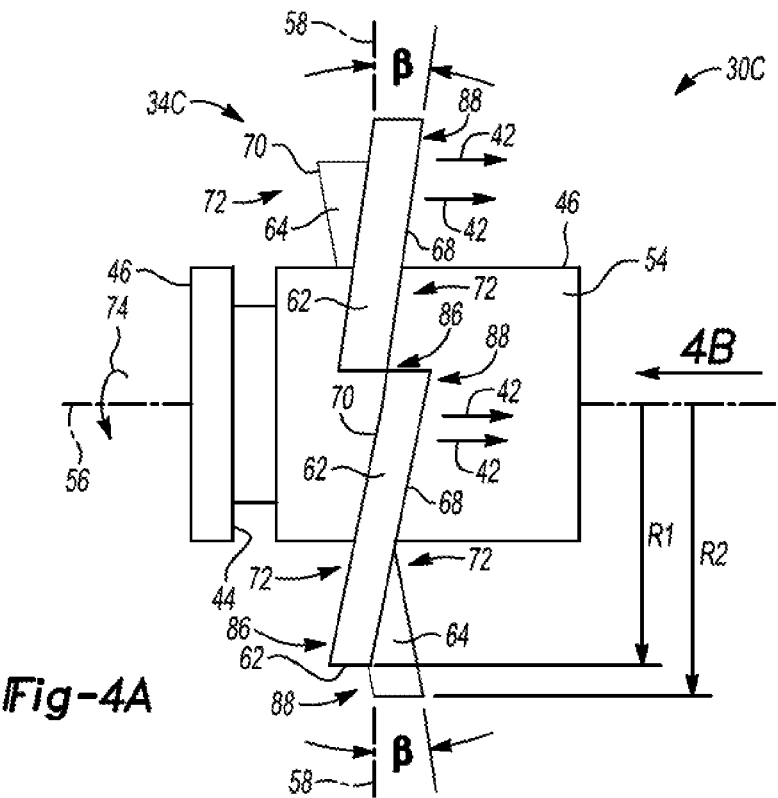
FIG. 4A is a schematic side view of a third example configuration of the oil deflector of FIG. 1.
Figure 4B:
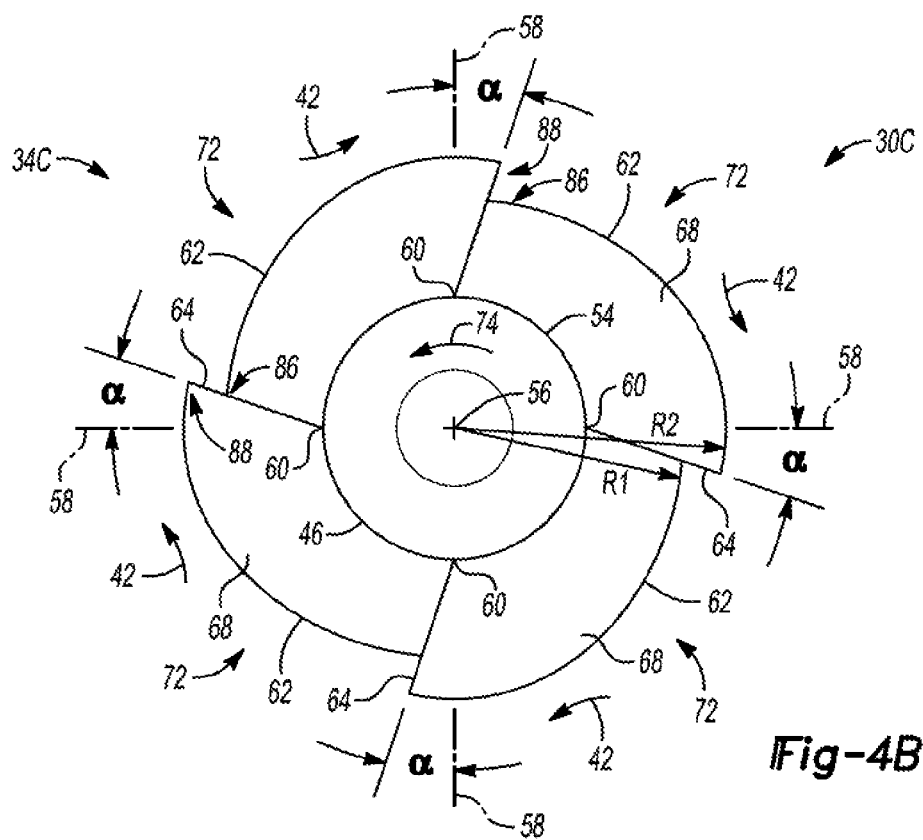
FIG. 4B is a schematic end view of the oil deflector of FIG. 4A.

Referring now to FIGS. 4A-4B, a third example configuration of the oil deflector 30 is generally indicated at 30C. The oil deflector 30C includes a segment array 34C extending radially from the sleeve portion 46 of the oil deflector 30C and defining a plurality of flange segments 72 distributed circumferentially relative to the sleeve portion 46 and the longitudinal axis 56. Each flange segment 72 defines a first annular face 68 and a second annular face 70 which in an installed position in the turbocharger 10 may be configured as an inboard face 68 and an outboard face 70 as described previously related to FIGS. 2A-2B. In the example shown in FIGS. 4A-4B for deflector 30C, the inboard and outboard faces 68, 70 may be substantially parallel to each other and inclined relative to the radial axis 58 by an angle β as shown in FIG. 4A, such that each segment 72 of the segment array 34C is skewed to a plane defined by the radial axes 58 and/or may be described as non-perpendicular to the longitudinal axis 56.

Each flange segment 72 further defines a peripheral face 62 and an offset face 64. The peripheral face 62 extends radially from a leading end 86 of the segment 72 to a trailing end 88 of the segment 72, where the leading end 86 and the trailing end 88 are relative to the direction of rotation 74 of the deflector 30C in use. The peripheral face 62 may be radially tapered, with a radius increasing from a leading radius R1 to a trailing radius R2, where R2≥R1, as shown in FIG. 4B. The offset face 64 is formed by the transition surface defined by the offset of the trailing end 88 of a first segment 72 and the leading end 86 of a second segment 72 circumferentially adjacent the first segment, as shown in FIGS. 4A-4B. The offset face 64 in the example shown may be generally configured as a parallelogram shaped face. In the non-limiting example shown in FIGS. 4A-4B, the offset face 64 of the deflector 30C may not extend exactly radially, but as shown in FIG. 4B, may be inclined from the radial axis 58 by a non-radial angle α originating from a point other than the intersection of the longitudinal and radial axes 56, 58. In the non-limiting example shown, the angle α may originate from an origin 60 coinciding with the intersection of the radial axis 58 and the exterior surface 54 of the sleeve portion 46.

In operation, the deflector 30C is rotated in the direction 74 by rotation of the shaft 20, where rotation of the deflector 30C creates pressure differentials along oil diverting features defined by the deflector 30B, which may include one or more or a combination of the peripheral faces 62, the adjacent offset faces 64 and the inclined inboard and outboard faces 68, 70 of the segment array 34C, such that oil 36 proximate to or contacting the deflector 30C travels along one or more of the faces 62, 64, 68, 70 to be flung radially and axially away from the deflector 30C along a diverted oil path 42, as shown in FIGS. 4A-4B and away from the sealed interface defined by the shaft seal 32 in contact with the recess 44 and annular shoulder 52, thereby preventing leakage of oil 36 through the oil seal plate 16 to the compressor 12.

Figure 5A:
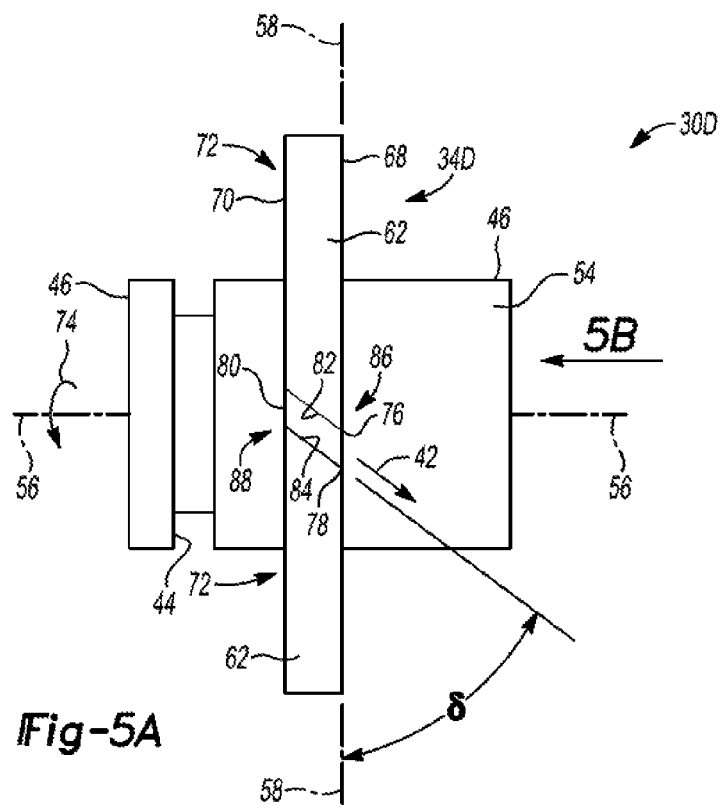
FIG. 5A is a schematic side view of a fourth example configuration of the oil deflector of FIG. 1.
Figure 5B:
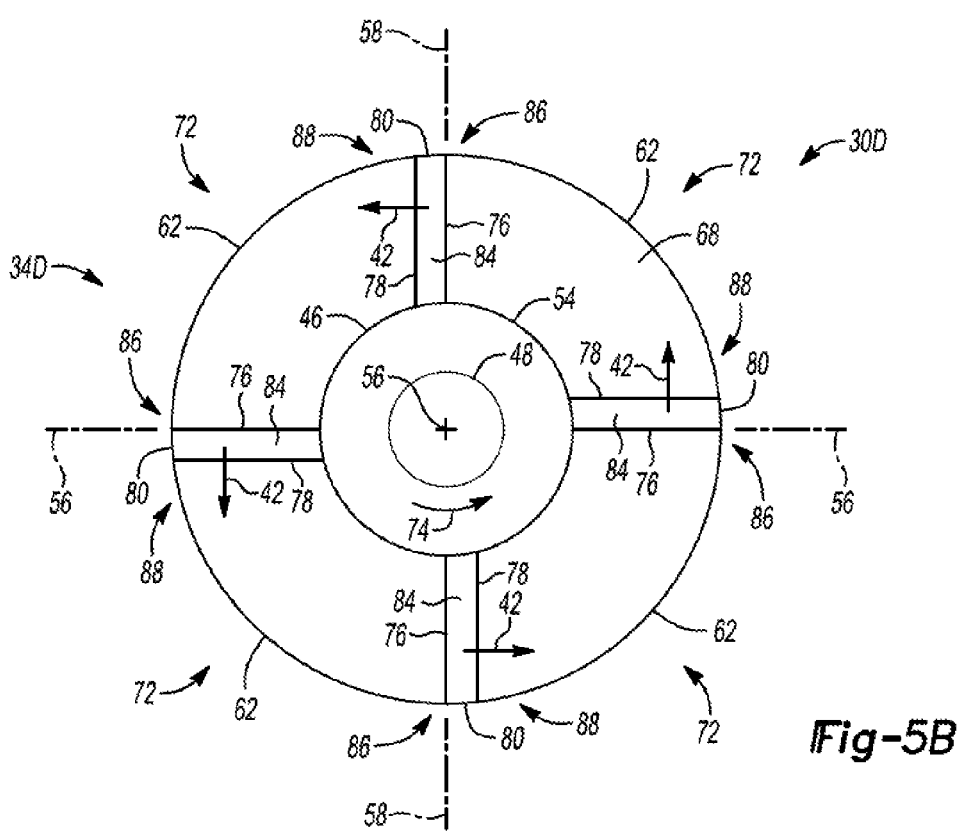
FIG. 5B is a schematic end view of the oil deflector of FIG. 5A.

Referring now to FIGS. 5A-5B, a fourth example configuration of the oil deflector 30 is generally indicated at 30D. The oil deflector 30D includes a segment array 34D extending radially from the sleeve portion 46 of the oil deflector 30D and defining a plurality of flange segments 72 distributed circumferentially relative to the sleeve portion 46 and the longitudinal axis 56. Each flange segment 72 defines a first annular face 68 and a second annular face 70 which in an installed position in the turbocharger 10 may be configured as an inboard face 68 and an outboard face 70 as described previously related to FIGS. 2A-2B. In the example shown in FIGS. 5A-5B for deflector 30D, the inboard and outboard faces 68, 70 may be substantially parallel to each other and to the radial axis 58 such that each segment 72 of the segment array 34D is substantially perpendicular to the longitudinal axis 56.

Each flange segment 72 further defines a peripheral face 62 extending radially from a leading end 86 of the segment 72 to a trailing end 88 of the segment 72, where the leading end 86 and the trailing end 88 are relative to the direction of rotation 74 of the deflector 30D in use. Adjacent segments are separated by a slot 80, which in the example shown in FIGS. 5A-5B is formed as a radial slot 80. The slot 80 is defined by a leading slot surface 82 at the leading end 86 of one segment and a trailing slot surface 84 at the trailing end 88 of an adjacent segment, as shown in FIG. 5A. The leading slot surface 82 and inboard face 68 define a leading edge 76 of the slot 80. In the non-limiting example shown, the leading edge 76 of the segment array 34D extends radially from the exterior surface 54 to coincide with the radial axis 58. The trailing slot surface 84 and inboard face 68 define a trailing edge 78 of the slot 80.

The leading and trailing slot surfaces 82, 84 are substantially parallel to each other and are inclined at an angle δ relative to the inboard face 68 and/or radial axis 58 of the oil deflector 30D, such that the slot 80 is angled to the inboard face 68 and skewed relative to the longitudinal axis 56. In operation, the deflector 30D is rotated in the direction 74 by rotation of the shaft 20, where rotation of the deflector 30D may create pressure differentials relative to the oil diverting features defined by the deflector 30D, including the slots 80, such that oil 36 proximate to the slots 80 and/or contacting the slot surfaces 82, 84 travels along one or more of the surfaces 82, 84 and/or is flung axially away from the deflector 30D along a diverted oil path 42, as shown in FIGS. 5A-5B and away from the sealed interface defined by the shaft seal 32 in contact with the recess 44 and annular shoulder 52, thereby preventing leakage of oil 36 through the oil seal plate 16 to the compressor 12.

Figure 6A:
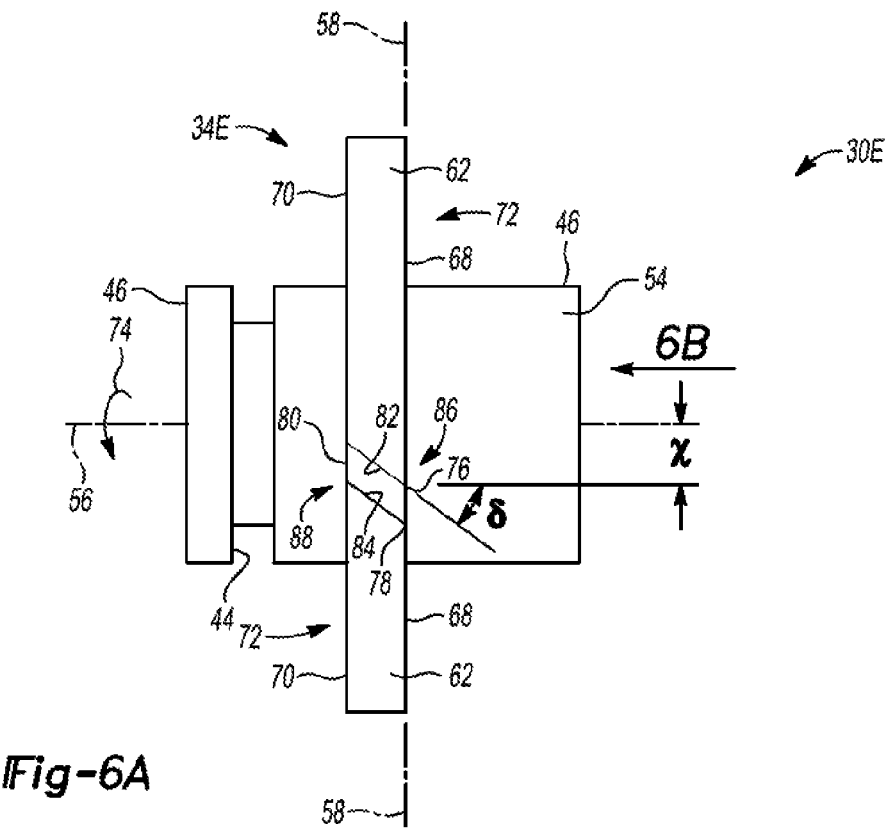
FIG. 6A is a schematic side view of a fifth example configuration of the oil deflector of FIG. 1.
Figure 6B:
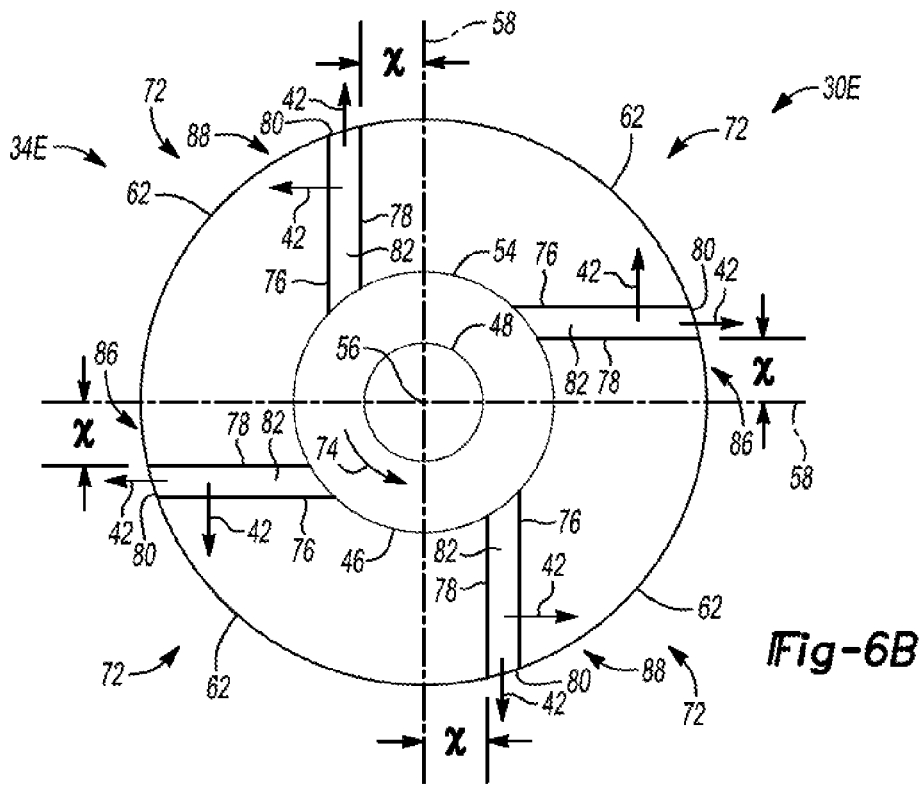
FIG. 6B is a schematic end view of the oil deflector of FIG. 6A.

Referring now to FIGS. 6A-6B, a fifth example configuration of the oil deflector 30 is generally indicated at 30E. The oil deflector 30E includes a segment array 34E extending radially from the sleeve portion 46 of the oil deflector 30E and defining a plurality of flange segments 72 distributed circumferentially relative to the sleeve portion 46 and to the longitudinal axis 56. Each flange segment 72 defines a first annular face 68 and a second annular face 70 which in an installed position in the turbocharger 10 may be configured as an inboard face 68 and an outboard face 70 as described previously related to FIGS. 2A-2B. In the example shown in FIGS. 6A-6B for deflector 30E, the inboard and outboard faces 68, 70 may be substantially parallel to each other and to the radial axis 58 such that each segment 72 of the segment array 34E is substantially perpendicular to the longitudinal axis 56.

Each flange segment 72 further defines a peripheral face 62 extending radially from a leading end 86 of the segment 72 to a trailing end 88 of the segment 72, where the leading end 86 and the trailing end 88 are relative to the direction of rotation 74 of the deflector 30E in use. Adjacent segments are separated by a slot 80, which in the example shown in FIGS. 6A-6B may be formed as a non-radial slot 80, which may also be referred to herein as an offset slot. The offset slot 80 is defined by a leading slot surface 82 at the leading end 86 of one segment and a trailing slot surface 84 at the trailing end 88 of an adjacent segment, as shown in FIG. 6A. The leading slot surface 82 and inboard face 68 define a leading edge 76 of the offset slot 80. The offset slots 80 and the leading edges 76 of the segment array 34E extend non-radially from the exterior surface 54 and relative to the longitudinal axis 56. In the non-limiting example shown in FIGS. 6A-6B, the offset slot 80 is generally parallel to and offset from a radial axis 58 by an offset dimension x. The trailing slot surface 84 and inboard face 68 define a trailing edge 78 of the slot 80.

The leading and trailing slot surfaces 82, 84 are substantially parallel to each other and are inclined at an angle δ relative to the inboard face 68 and/or radial axis 58 of the oil deflector 30E, such that the slot 80 is angled to the inboard face 68 and skewed relative to the longitudinal axis 56 and the radial axis 58. In operation, the deflector 30E is rotated in the direction 74 by rotation of the shaft 20, where rotation of the deflector 30E may create pressure differentials relative to the oil diverting features defined by the deflector 30E, e.g., relative to the slots 80 such that oil 36 proximate to the slots 80 and/or contacting the slot surfaces 82, 84 travels along one or more of the surfaces 82, 84 and/or is flung axially and radially away from the deflector 30E along a diverted oil path 42, as shown in FIGS. 6A-6B and away from the sealed interface defined by the shaft seal 32 in contact with the recess 44 and annular shoulder 52, thereby preventing leakage of oil 36 through the oil seal plate 16 to the compressor 12.

The examples described herein are intended to be non-limiting, and other configurations of an oil deflector 30 and/or oil diverting features defined by the oil deflector 30 are possible. For example, the radial offset face 64 of the deflector 30B may be inclined by a non-radial angle α as described for deflectors 30A, 30C. The non-radial offset face 64 of the deflectors 30A, 30C may be configured as radial offset faces 64 as described for the deflector 30B. The peripheral faces 62 of the respective segments 72 of the oil deflectors 30B and 30C may be formed without a radial taper, such that R1=R2. By way of further example, the peripheral face 62 of the segments 72 of the oil deflectors 30D, 30E may be radially tapered, with a radius increasing from a leading radius R1 to a trailing radius R2, as described for the example deflector 30A. The segment arrays 34A-34E of the respective deflector examples 30A-30 are each shown with four segments 72 in an array 34, but may be configured to contain two, three, or four or more segments 72 comprising a deflector 30 as described herein. The number of segments 72 forming the segment array 34, the angles α, β, δ as defined by the respective example configurations of the deflector sleeve 30, the magnitude of the tapers and/or incline defined by T1, T2 and/or R1,R2, and/or the width and radial offset x of the slot 80 may be varied as required by the configuration of the turbocharger 10 including for example, the configuration of the oil seal plate 16, the bearing system, and the lubrication system including the oil outlet port 40, to generate the diverted oil paths 42 as required by the turbocharger 10 in use. The deflector sleeve 30 may be configured for mounting to the turbine end of the shaft 20, to divert oil from a sealed interface (not shown) between the bearing housing 18 and the turbine housing (not shown).

While the best modes for carrying out the invention have been described in detail, those familiar with the art to which this invention relates will recognize various alternative designs and embodiments for practicing the invention within the scope of the appended claims.

The invention claimed is:

1. An oil deflector comprising:
    a sleeve portion defining a longitudinal axis; and
    a segment array extending radially from the sleeve portion;
    the segment array including a plurality of segments distributed circumferentially relative to the longitudinal axis;
    wherein each segment of the plurality of segments defines a peripheral face, a leading end, and a trailing end;
    wherein the peripheral face is defined by a radius which increases from the leading end of the segment to the trailing end of the segment; and
    wherein the segment array defines an oil diverting feature configured to create a pressure differential proximate the segment array during rotation of the oil deflector about the longitudinal axis.

2. The oil deflector of claim 1, wherein the peripheral face is radially tapered relative to the longitudinal axis.

3. The oil deflector of claim 1, further comprising:
    an offset face extending between a first segment of the plurality of segments and a second segment of the plurality of segments; and
    wherein the first segment and the second segment are circumferentially adjacent segments.

4. The oil deflector of claim 3, further comprising:
    a radial axis intersecting with and perpendicular to the longitudinal axis; and
    wherein the offset face is inclined relative to the radial axis.

5. The oil deflector of claim 3, wherein the offset face is configured as a parallelogram shaped face.

6. The oil deflector of claim 1, wherein:
    at least one segment of the plurality of segments defines an annular face; and
    the annular face is axially tapered relative to the longitudinal axis.

7. The oil deflector of claim 1, wherein:
    each segment of the plurality of segments defines a first annular face and a second annular face;
    the first annular face is perpendicular to the longitudinal axis; and
    the second annular face is inclined relative to the first annular face.

8. The oil deflector of claim 1, wherein:
    each segment of the plurality of segments defines a first annular face and a second annular face; and
    the first and second annular faces are parallel to each other and skewed to the longitudinal axis.

9. The oil deflector of claim 1, further comprising:
    a slot extending between a first segment of the plurality of segments and a second segment of the plurality of segments;
    wherein:
        the first segment and the second segment are circumferentially adjacent segments; and
        the slot is angled relative to an annular face defined by the segment array.

10. The oil deflector of claim 9, wherein the slot is configured as a radial slot.

11. The oil deflector of claim 9, wherein the slot is configured as a non-radial slot.

12. An oil sealing system for a turbocharger including a turbocharger shaft, the oil sealing system comprising:
    an oil deflector including:
        a sleeve portion defining a longitudinal axis and configured to be rotatably mounted to the turbocharger shaft;
        a segment array extending radially from the sleeve portion;
        the segment array including:
            a plurality of segments circumferentially distributed relative to the longitudinal axis;
            an offset face extending radially between each respective segment of the plurality of segments and another segment of the plurality of segments;
            wherein said another segment is circumferentially adjacent the respective segment;
            wherein the offset face and the longitudinal axis are co-planar; and
        wherein:
            each respective segment of the plurality of segments extends radially from the sleeve portion and defines a peripheral face; and
            the peripheral face of each respective segment is radially tapered and configured to divert oil radially from the peripheral face during rotation of the oil deflector by the turbocharger shaft.

13. The oil sealing system of claim 12, wherein:
    each segment of the plurality of segments defines a first annular face and a second annular face;
    the first annular face is perpendicular to the longitudinal axis; and
    the second annular face is inclined relative to the first annular face and configured to divert oil axially from the peripheral face during rotation of the oil deflector by the turbocharger shaft.

14. The oil sealing system of claim 12, wherein:
    each segment of the plurality of segments defines a first annular face and a second annular face;
    the first and second annular faces are parallel to each other and skewed to the longitudinal axis; and
    at least one of the first and second annular faces are configured to divert oil axially from the peripheral face during rotation of the oil deflector by the turbocharger shaft.

15. The oil sealing system of claim 12, wherein each segment of the plurality of segments defines a leading end and a trailing end; and wherein the leading end of the first segment, the trailing end of the second segment, the offset face and the longitudinal axis are co-planar.

16. An oil sealing system for a turbocharger including a turbocharger shaft, the oil sealing system comprising:

an oil deflector including:

a sleeve portion defining a longitudinal axis and configured to be rotatably mounted to the turbocharger shaft;

a segment array extending radially from the sleeve portion;

the segment array including:

a plurality of segments circumferentially distributed relative to the longitudinal axis;

each of the segments of the plurality of segments defining a first annular face and a second annular face;

wherein the first annular face is axially offset from the second annular face relative to the longitudinal axis;

wherein the first annular face includes a leading edge extending radially from the sleeve portion and a trailing edge extending radially from the sleeve portion;

wherein the leading edge and the trailing edge are perpendicular to each other;

a slot extending radially between each respective segment of the plurality of segments and another segment of the plurality of segments;

wherein:

the respective segment and the another segment are circumferentially adjacent segments which are separated by the slot;

the slot is defined by the leading edge of the respective segment and the trailing edge of said another segment; and the slot extends from the first annular face to the second annular face and is configured to divert oil axially during rotation of the oil deflector by the turbocharger shaft.

17. The oil sealing system of claim 16, wherein the slot is a radial slot.

18. The oil sealing system of claim 16, wherein the slot is a non-radial slot and is configured to divert oil radially and axially during rotation of the oil deflector by the turbocharger shaft.

19. The oil sealing system of claim 16, wherein the slot is inclined relative to the first annular face and the second annular face.

20. The oil sealing system of claim 16, wherein the first annular face is parallel to and opposing the second annular face.

* * * * *